United States Patent [19]

Sanders

[11] Patent Number: 5,361,610
[45] Date of Patent: Nov. 8, 1994

[54] TOTELOCK

[76] Inventor: Richard Sanders, 29 Harwich Cr., Westwood, Mass. 02090

[21] Appl. No.: 124,649

[22] Filed: Sep. 22, 1993

[51] Int. Cl.$^5$ ............................................. E05B 73/00
[52] U.S. Cl. ............................................ 70/14; 70/58; 70/163; 70/424; 248/552
[58] Field of Search ................ 70/14, 57, 58, 158–173, 70/416, 423, 424, 427, 428; 360/86, 97.01, 98.01, 97.02, 98.08, 99.08, 99.12, 137, 105; 369/77.1, 77.2, 292; 248/551–553

[56] References Cited

U.S. PATENT DOCUMENTS

| | | | |
|---|---|---|---|
| 4,027,798 | 6/1977 | Swaim | 248/552 X |
| 4,308,733 | 1/1982 | Tampa | 248/552 X |
| 4,365,280 | 12/1982 | Crosetti et al. | 360/137 |
| 4,640,106 | 2/1987 | Derman | 70/58 X |
| 4,685,312 | 8/1987 | Lakoski et al. | 70/14 |
| 4,733,840 | 3/1988 | D'Amore | 248/551 X |
| 4,738,428 | 4/1988 | Themistos et al,. | 248/551 |
| 4,794,587 | 12/1988 | Cordiano | 70/14 X |
| 4,856,304 | 8/1989 | Derman | 70/58 X |
| 4,918,952 | 4/1990 | Lakoski et al. | 70/57 |
| 4,924,683 | 5/1990 | Derman | 70/14 |
| 4,964,285 | 10/1990 | Lakoski et al. | 70/58 X |
| 5,117,661 | 6/1992 | Carl et al. | 70/58 X |
| 5,136,862 | 8/1992 | Langen | 70/58 X |

FOREIGN PATENT DOCUMENTS

| | | | |
|---|---|---|---|
| 454901 | 3/1949 | Canada | 70/424 |
| 455740 | 3/1913 | France | 70/424 |
| 447091 | 5/1936 | United Kingdom | 70/424 |

*Primary Examiner*—Peter M. Cuomo
*Assistant Examiner*—Suzanne L. Dino
*Attorney, Agent, or Firm*—John P. McGonagle

[57] ABSTRACT

A pair of plates that are inserted into the disk drive of a computer. The plates are then locked together by the addition of a padlock or other locking means thus preventing disk drive use and removal of the plates. The plates and computer can be secured to a fixed object with an anti-theft means or cable system in combination with the padlock to prevent the computer from being stolen or removed from a fixed location.

25 Claims, 6 Drawing Sheets

TOTELOCK

BACKGROUND OF THE INVENTION

This invention relates to security apparatus, and more particularly to apparatus for securing office equipment.

In recent years there has been a marked increase in the amount of office equipment used in business. Much of the equipment, i.e., typewriters, word processors, facsimile transmission equipment, and mini computers, is portable and easily moved. Equipment items in this category generally have a value from several hundreds of dollars to several thousands of dollars, and are easily marketed. Equipment such as this and their component parts are, therefore attractive, lucrative and easy targets for thieves.

Computer owners and retailers of computers also have a difficult time publicly using or displaying merchandise for the public because of theft or shoplifting of computers. This is due to the extreme value of computers. Computer owners carry with them and use in areas with public access smaller computers such as laptop and notebook computers. Stores and retailers need to display computers in order to attract customers to purchase computers from them and also to show the latest products. The theft problem is especially relevant with the displaying of laptop and notebook computers. Because of the small size of these computers, they can easily be hidden in jackets or brief cases and stolen. This results in potentially large losses to an individual or store displaying this merchandise due to shoplifting.

Stores and retailers also have a problem with customers using their own software on the computers on display. With the disk drive doors open, customers can insert and use the customers software in the retailers computer. Retailers risk infection of their computers with viruses which may be on the software that a customer inserts into the computer. This virus could be purposefully installed in the computer by a disgruntled employee or the customer could unknowingly install this virus into the computer. If the computer is on the store network, the virus could corrupt the stores entire network and cause great expense and inconvenience.

SUMMARY OF THE INVENTION

In view of the foregoing disadvantages inherent in the known types of devices now present in the prior art, the present invention provides primarily a locking mechanism for preventing the theft of a computer and provides secondarily in combination with a locking mechanism a means for preventing unauthorized use of a computer disk drive.

To attain this, the present invention provides a pair of plates that are inserted into the disk drive of a computer. The plates are then locked together by the addition of a padlock or other locking means thus preventing disk drive use and removal of the plates. The plates and computer can be secured to a fixed object with an anti-theft means or cable system in combination with the padlock to prevent the computer from being stolen or removed from a fixed location.

This invention can also be used by an individual who wants to secure their own personal computer to an office desk or by a student to secure a personal computer to a dorm room desk. It may also be used to prevent disk drive use.

Accordingly, it is an object of the present invention to provide a universal security apparatus for securing office equipment of varying types, especially smaller computers such as laptop computers and notebook computers.

It is additionally an object of the present invention to provide such an apparatus which is economical, easy to use and quickly installed.

Another object of the invention is to provide such a security apparatus which is installed upon and about office equipment cabinetry without penetrating the surface of said cabinetry thereby removing the risk of contacting various components and circuitry therewithin.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

DETAILED DESCRIPTION OF THE INVENTION

Figure 1:
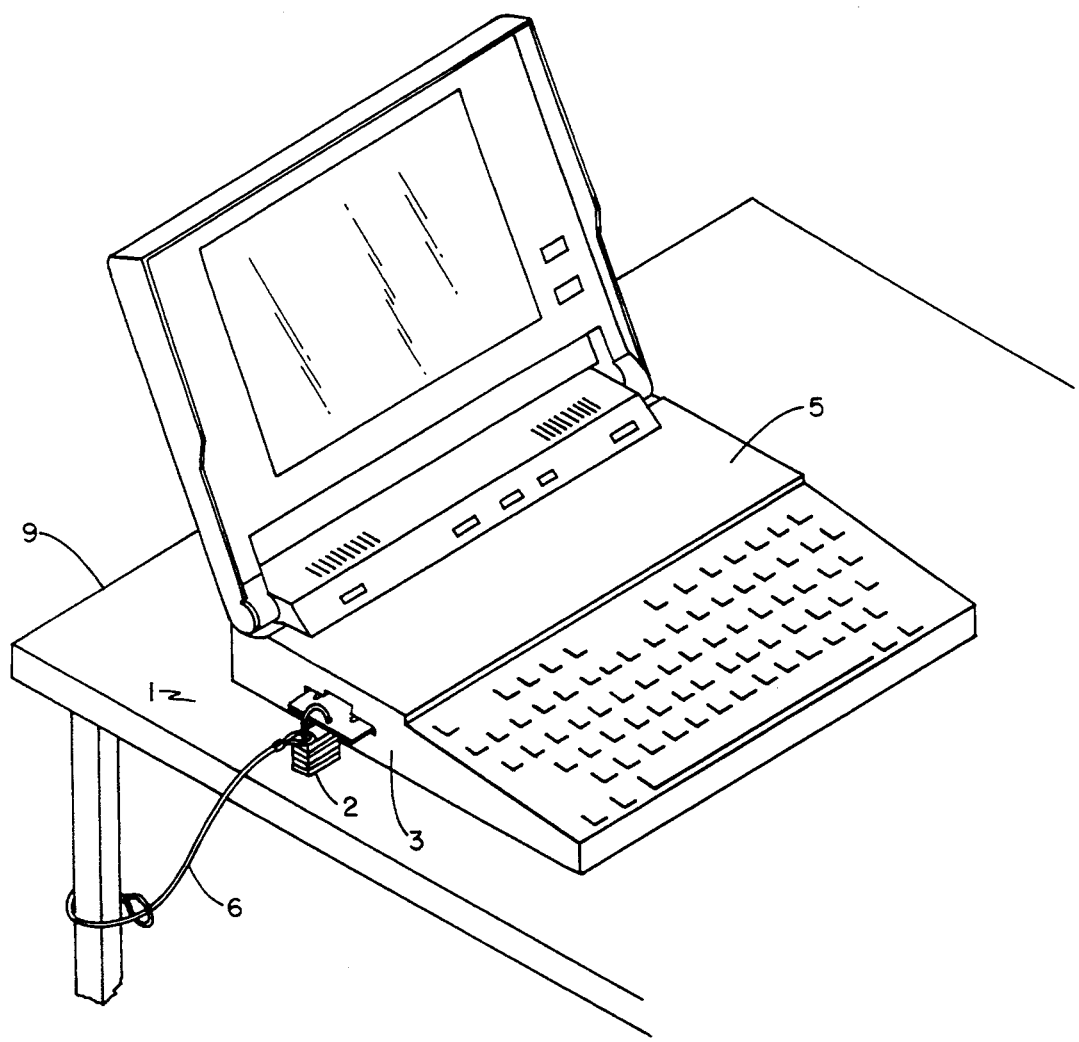
FIG. 1 is a perspective view of a laptop computer with the present invention installed therein.
Figure 2:
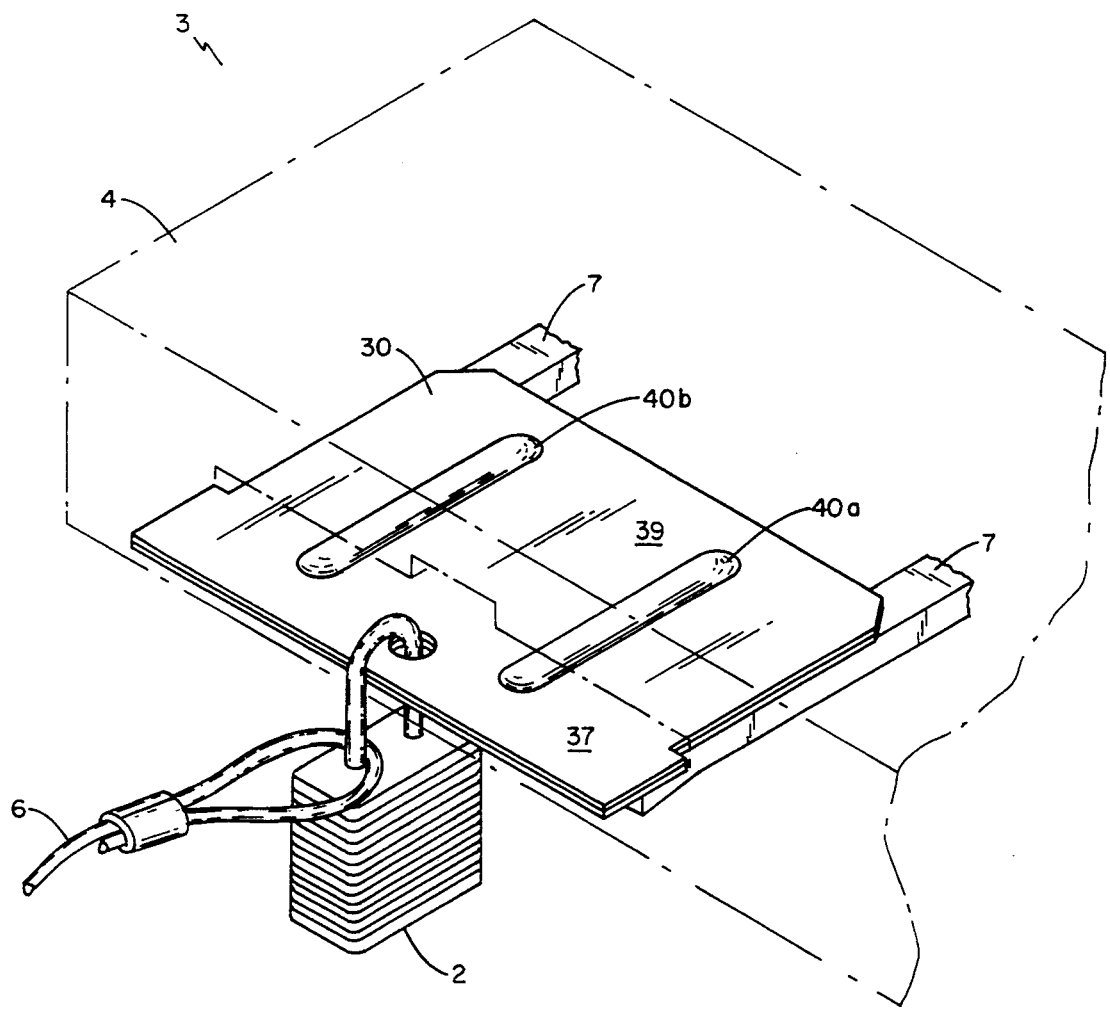
FIG. 2 is a perspective view of the invention as shown in FIG. 1.
Figure 3:
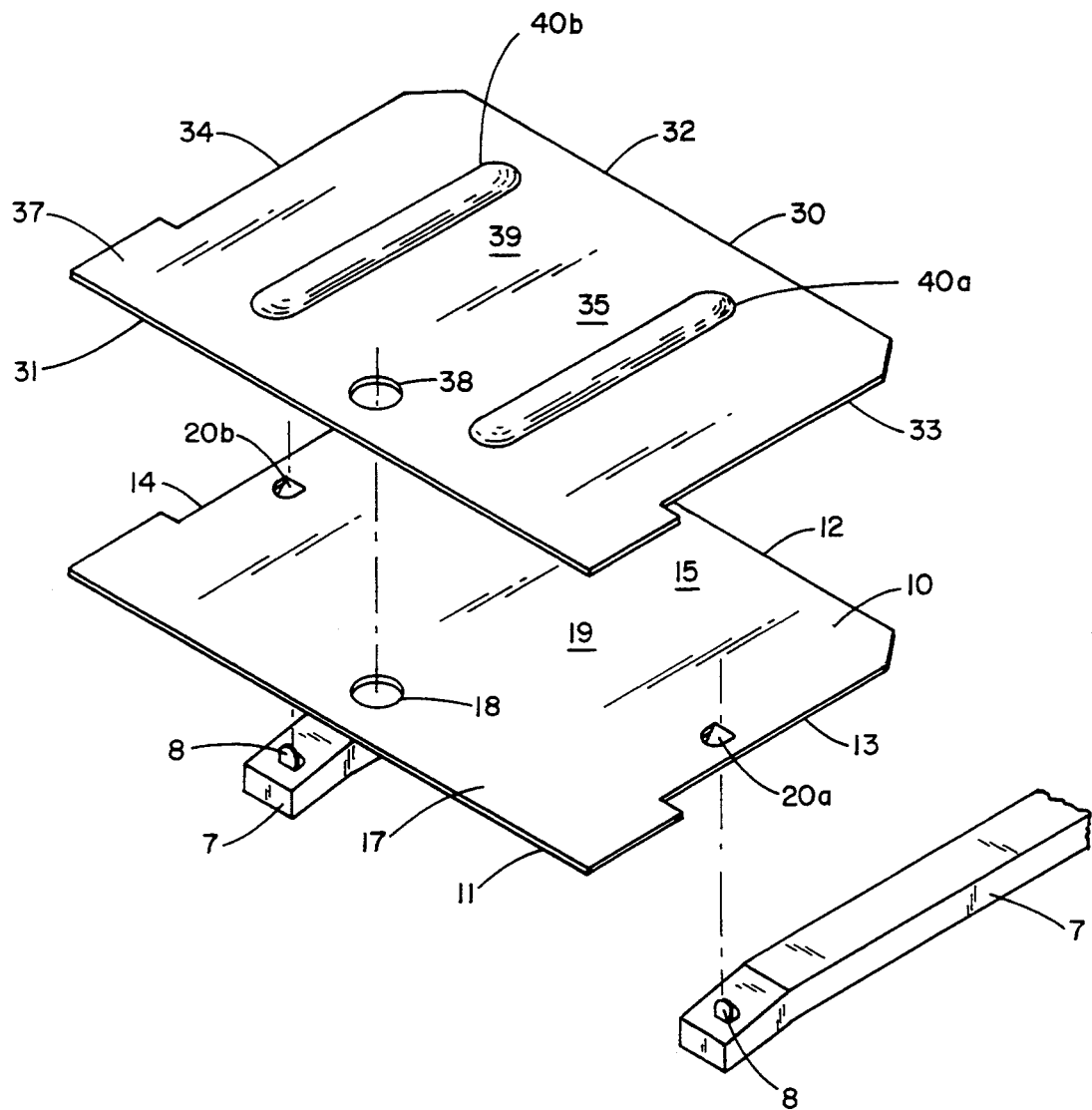
FIG. 3 is an exploded view of FIG. 2 without a locking mechanism.
Figure 4:
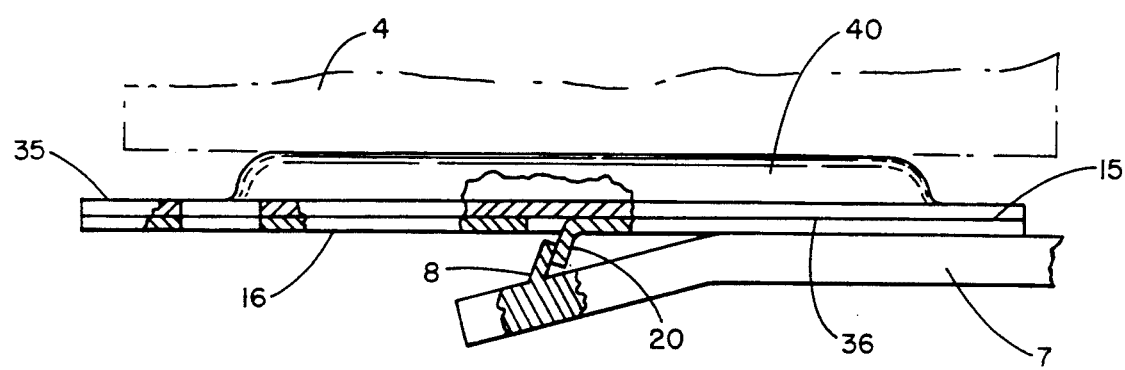
FIG. 4 is a cross-sectional view of FIG. 2 without a locking mechanism.
Figure 5B:
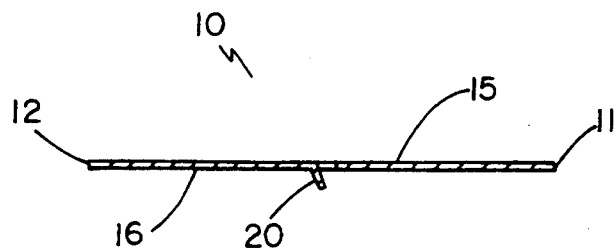
FIG. 5B is a cross-sectional view along the line 5B—5B of FIG. 5A.
Figure 5A:
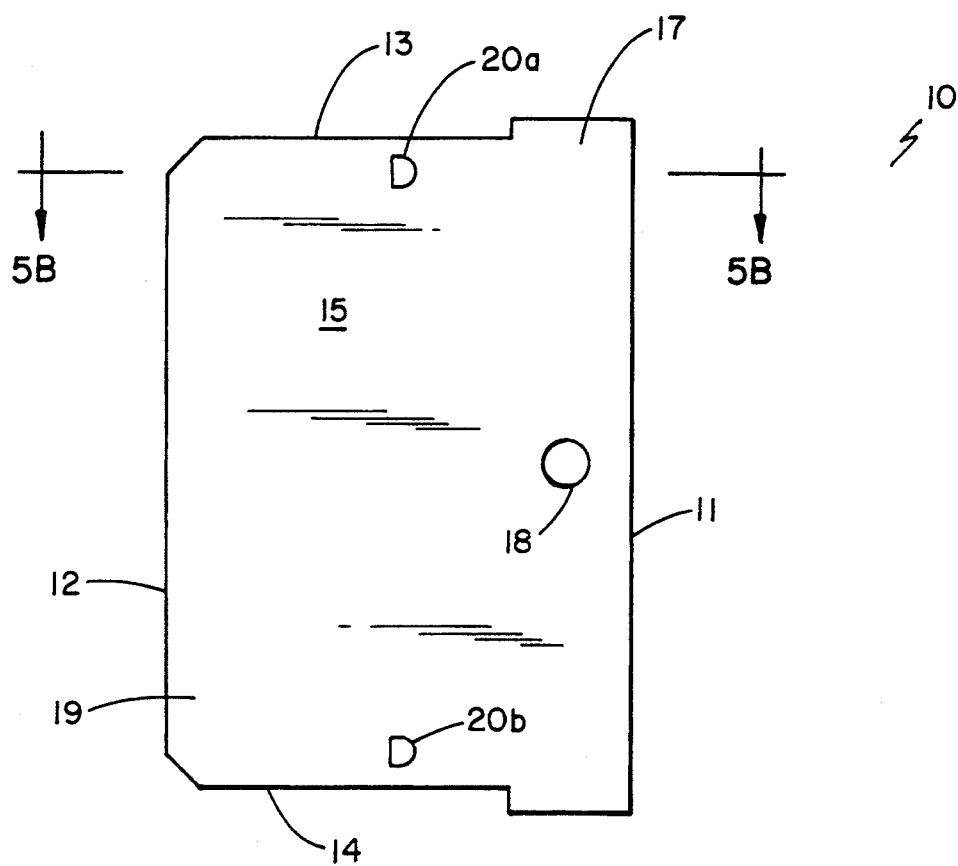
FIG. 5A is a top view of the first plate of the invention.
Figure 6B:
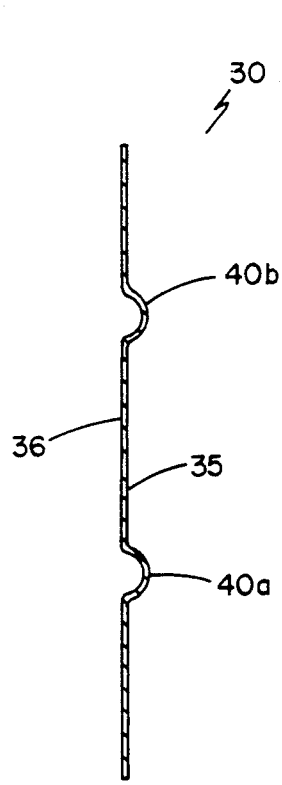
FIG. 6B is a cross-sectional view along the line 6B—6B of FIG. 6A.
Figure 6A:
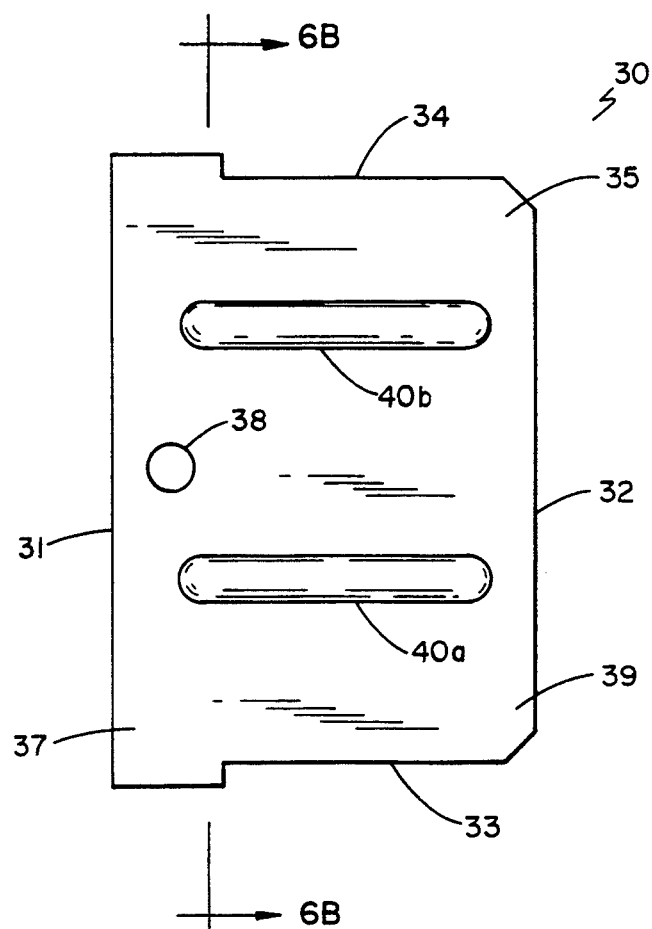
FIG. 6A is a top view of the second plate of the invention.
Figure 6C:
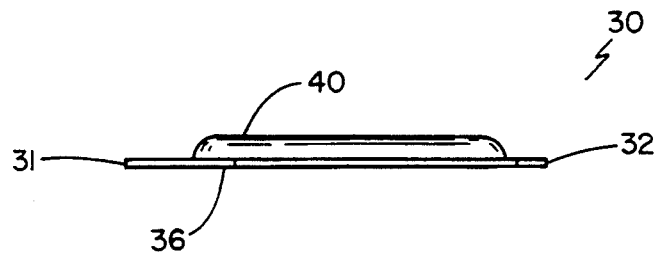
FIG. 6C is a side elevational view of the second plate of FIG. 6A.

Referring to the drawings in detail wherein like elements are indicated by like numerals, there is shown an embodiment of the totelock 1 of the present invention. In the example shown, the computer 5 is a laptop computer and the disk drive 3 is a 3½ inch floppy drive. The computer secured could be a smaller notebook computer or a larger personal computer. The floppy drive 3 has a pivotal entry door (not shown) through which a 3½ inch diskette (not shown) is inserted. When inserted the diskette engages a pair of rails 7 or equivalent guides for positioning the diskette when inserted into the drive 3. The rails or guides 7 are usually made with small tab holes or protruding guide tabs 8 near to the drive 3 entry door. The totelock 1 consists of two plates 10, 30 manufactured from rigid material. In this embodiment of the invention they are made from stainless steel. The plates 10, 30 are of a size such that they will fit into a disk drive 3 of a computer 5 much like a diskette. The plates may be designated as a first plate 10 and a second plate 30.

The first plate 10 has a generally rectangular shape, with a front edge 11, a back edge 12, a right side edge 13, a left side edge 14, top 15 and bottom 16 surface planes, a predetermined length measured from the front edge 11 to the back edge 12, and a predetermined width measured from the right edge 13 to the left edge 14. The back edge 12 is defined as that edge first moved through the disk drive entry door. The bottom surface plane 16 is defined as that surface immediately engaging the guide rails 7. The front edge 11 is formed into a plate shoulder 17 having a width larger than the width of the back edge 12. The plate contains a body portion 19 defined as the area between the plate shoulder 17, back edge 12 and bordered by the right and left side edges 13, 14. The back edge 12 width is nearly the width of the disk drive entry door. The first plate 10 also has a lock hole 18 formed in and substantially centered on the width of the plate shoulder 17. The first plate 10 has a pair of tabs extending down from the bottom plane 16. A right tab 20a and a left tab 20b of a predetermined length and predetermined distance from the front edge 11 and right 13 and left 14 edges, extend from the bottom surface plane 16 of the plate 10 at an angle of approximately seventy degrees measured from the plane defined by the area between the tabs 20 and the front edge 11. The first plate 10 is inserted into the disk drive 3 and the tabs 20a and 20b position themselves into the guide rail tab holes or over the guide rail protruding guide tabs 8. The first plate shoulder portion 17 and lock hole 18 remain outside the disk drive 3 when the first plate 10 is properly inserted into the disk drive 3.

The second plate 30 is approximately the same size and shape as the first plate 10. The second plate 30 has a front edge 31, a back edge 32, a right edge 33, a left edge 34, top 35 and bottom 36 surface planes, a predetermined length measured from the front edge 31 to the back edge 32, and a predetermined width measured from the right edge 33 to the left edge 14. The second plate 30 also has a shoulder 37 formed along the front edge 31 and having a width larger than the width of the back edge 32. The plate 30 also contains a body portion 39 defined as the area between the plate shoulder 37, back edge 32 and bordered by the right and left side edges 33, 34. The second plate 30 has a lock hole 38 formed in and substantially centered on the width of the plate shoulder 37. The second plate 30 is inserted into the disk drive 3, through the entry door, onto the top surface plane 15 of the first plate 10 such that the second plate bottom surface plane 36 lies flat against the first plate top surface plane 15.

The second plate 30 has a pair of ridges 40 formed on its top surface plane 35 along the body portion 39. The ridges 40 run from the shoulder portion 37 parallel to the right and left side edges 33, 34 to the proximate area of the back edge 32. The ridges 40 have a rounded profile. When inserted into the disk drive 3, the ridges 40 are entirely inside the disk drive housing 4. The right ridge 40a and left ridge 40b have a predetermined length and height, and are positioned a predetermined distance from the front edge 31. The ridges 40a and 40b extend parallel to one another and the right and left edges 33, 34 of the plate 30, from the plate shoulder 37 toward the back edge 32. The right ridge 40a and the left ridge 40b extend up away from the plate top surface plane 35.

The second plate 30 lock hole 38 formed in the shoulder portion 37 remains outside the disk drive housing 4 when the plate 30 is properly inserted into the drive slot. The lock hole 38 on the second plate 30 aligns with the lock hole 18 on the first plate 10. The two plates 10, 30 can then be locked together with a padlock 2 or other locking means. When the two plates 10, 30 are locked together, they cannot as a pair be removed from the disk drive 3 without breaking the disk drive 3 itself. When both plates 10, 30 are inserted and locked together, the disk drive 3 is unusable. In another embodiment, the padlock or locking means can be combined and tethered with an anti-theft means, such as a steel cable 6 having loops at both ends, and the computer 5 can be secured to a fixed object, such as a table 9.

The plates 10, 30 as a pair are not removable from the disk drive 3 because of the tabs 20 on the first plate 10, and the ridges 40 on the second plate 30. The overall height of the tabs 20 combined with the ridges 40, makes the combined height of the plates 10, 30 too large to be removed as a pair from the computer disk drive 3. The two plates 10, 30 are designed such that they cannot be removed together and must be removed one at a time. To remove the plates 10, 30, the padlock 2 or other locking means must be removed, and the second plate 30 pulled from the disk drive 3. The first plate 10 is then urged slightly further into the disk drive 3 and lifted upwardly thereby disengaging the tabs 20 from the guide rail tabs or holes 8. The first plate 10 is then removed from the disk drive 3. The disk drive 3 can then be utilized and the computer 5 can be moved to another location.

It is understood that the above-described embodiment is merely illustrative of the application. Other embodiments may be readily devised by those skilled in the art which will embody the principles of the invention and fall within the spirit and scope thereof.

I claim:

1. A locking mechanism for a computer with a disk drive having an external entry door and internal guide rails with tab holes, comprising:

a rigid first plate adapted for insertion into said disk dive and having a front edge, a back edge, two side edges, top and bottom surface planes, a plate shoulder formed on the front edge, and a plate body between the plate shoulder and the back edge, a pair of tabs extending in the downward direction from the bottom surface plane of the first plate body and adapted for insertion into said guide rail tab holes, and a lock hole formed centrally in the plate shoulder;

a rigid second plate adapted for insertion into said disk drive and having a front edge, a back edge, two side edges, top and bottom surface planes, a plate shoulder formed on the front edge, and a plate body between the plate shoulder and the back edge, a pair of ridges extending in an upward direction away from the top surface plane of the second plate body, and a lock hole formed centrally in the plate shoulder;

wherein said second plate is inserted into said disk onto the top surface plane of the first plate such that the second plate bottom surface plane lies flat against the first plate top surface plane;

wherein said first and second plate lock holes align when both plates are inserted into said disk drive;

a locking means for securing said lock holes of said inserted first and second plates; and means for tethering said locking means to an object;

wherein the combined height of the first and second plates inserted together into the disk drive together is such that the plates cannot be removed from the disk drive together;

wherein said first and second plate shoulder portions and lock holes are adapted to remain outside the disk drive when inserted into the disk drive;

wherein the second plate ridges extend from the plate shoulder toward the back edge parallel to one another and parallel to the second plate right and left edges; and wherein said first plate tabs angle away from the first plate bottom surface plane at an angle of approximately seventy degrees from a plane defined by the area between the tabs and the front edge of the first plate.

2. A locking mechanism as described in claim 1, wherein:

said ridges have a substantially rounded profile.

3. A locking mechanism as described in claim 2, wherein:

said rigid first and second plates are made from stainless steel.

4. A locking mechanism as described in claim 3, wherein:

said locking means is a padlock.

5. A locking mechanism as described in claim 4, wherein:

said means for tethering said locking means is a steel cable with loops at both ends.

6. A locking mechanism in combination with a computer disk drive having an external entry door and internal guide rails with tab holes, comprising:

a rigid first plate adapted for insertion into said disk drive and having a front edge, a back edge, two side edges, top and bottom surface planes, a plate shoulder formed on the front edge, and a plate body between the plate shoulder and the back edge, a pair of tabs extending in the downward direction from the bottom surface plane of the first plate body and adapted for insertion into said guide rail tab holes, and a lock hole formed centrally in the plate shoulder;

a rigid second plate adapted for insertion into said disk drive and having a front edge, a back edge, two side edges, top and bottom surface planes, a plate shoulder formed on the front edge, and a plate body between the plate shoulder and the back edge, a pair of ridges extending n an upward direction away from the top surface plane of the second plate body, and a lock hole formed centrally in the plate shoulder; wherein said second plate is inserted into said disk onto the top surface plane of the first plate such that the second plate bottom surface plane lies flat against the first plate top surface plane;

wherein aid first and second plate lock holes align when both plates are inserted into said disk drive; and a locking means for securing said lock holes of said inserted first and second plates.

7. A locking mechanism as described in claim 6, further comprising:

means for tethering said locking means to an object.

8. A locking mechanism as described in claim 7, wherein:

the combined height of the first and second plates inserted together into the disk drive together is such that the plates cannot be removed from the disk drive together.

9. A locking mechanism as described in claim 8, wherein:

said first and second plate shoulder portions and lock holes are adapted to remain outside the disk drive when inserted into the disk drive.

10. A locking mechanism as described in claim 9, wherein:

the second plate ridges extend from the plate shoulder toward the back edge parallel to one another and parallel to the second plate right and left edges.

11. A locking mechanism as described in claim 10, wherein:

said first late tabs angle away from the first plate bottom surface plane at an angle of approximately seventy degrees from a plane defined by the area between the tabs and the front edge of the first plate.

12. A locking mechanism as described in claim 11, wherein:

said ridges have a substantially rounded profile.

13. A locking mechanism as described in claim 12, wherein:

said rigid first and second plates are made from stainless steel.

14. A locking mechanism as described in claim 13, wherein:

said locking means is a padlock.

15. A locking mechanism as described in claim 14, wherein:

said means for tethering said locking means is a steel cable with loops at both ends.

16. A locking mechanism in combination with a computer disk drive having an external entry door and internal guide rails with protruding guide tabs, comprising:

a rigid first plate adapted for insertion into said disk drive and having a front edge, a back edge, two side edges, top and bottom surface planes, a plate shoulder formed on the front edge, and a plate body between the plate shoulder and the back edge, a pair of tabs extending in the downward direction from the bottom surface plane of the first plate body and adapted for insertion into said guide rail guide tabs, and a lock hole formed centrally in the plate shoulder;

a rigid second plate adapted for insertion into said disk drive and having a front edge, a back edge, two side edges, top and bottom surface planes, a plate shoulder formed on the front edge, and a plate body between the plate shoulder and the back edge, a pair of ridges extending in an upward direction away from the top surface plane of the second plate body, and a lock hole formed centrally in the plate shoulder; wherein said second plate is inserted into said disk onto the top surface plane of the first plate such that the second plate bottom surface plane lies flat against the first plate top surface plane;

wherein said first and second plate lock holes align when both plates are inserted into said disk drive; and a locking means for securing said lock holes of said inserted first and second plates.

17. A locking mechanism as described in claim 16, further comprising:

means for tethering said locking means to an object.

18. A locking mechanism as described in claim 17, wherein:

the combined height of the first and second plates inserted together into the disk drive together is such that the plates cannot be removed from the disk drive together.

19. A locking mechanism as described in claim 18, wherein:
said first and second plate shoulder portions and lock holes are adapted to remain outside the disk drive when inserted into the disk drive.

20. A locking mechanism as described in claim 19, wherein:
the second plate ridges extend from the plate shoulder toward the back edge parallel to one another and parallel to the second plate right and left edges.

21. A locking mechanism as described in claim 20, wherein:
said first plate tabs angle away from the first late bottom surface plane at an angle of approximately seventy degrees from a plane defined by the area between the tabs and the front edge of the first plate.

22. A locking mechanism as described in claim 21, wherein:
said ridges have a substantially rounded profile.

23. A locking mechanism as described in claim 22, wherein:
said rigid first and second plates are made from stainless steel.

24. A locking mechanism as described in claim 23, wherein:
said locking means is a padlock.

25. A locking mechanism as described in claim 24, wherein:
said means for tethering said locking means is a steel cable with loops at both ends.

* * * * *